H. T. MORGAN.
GOVERNOR STOP CONTROL AND BELT TIGHTENER.
APPLICATION FILED DEC. 19, 1912.
1,095,513.
Patented May 5, 1914.
2 SHEETS—SHEET 1.
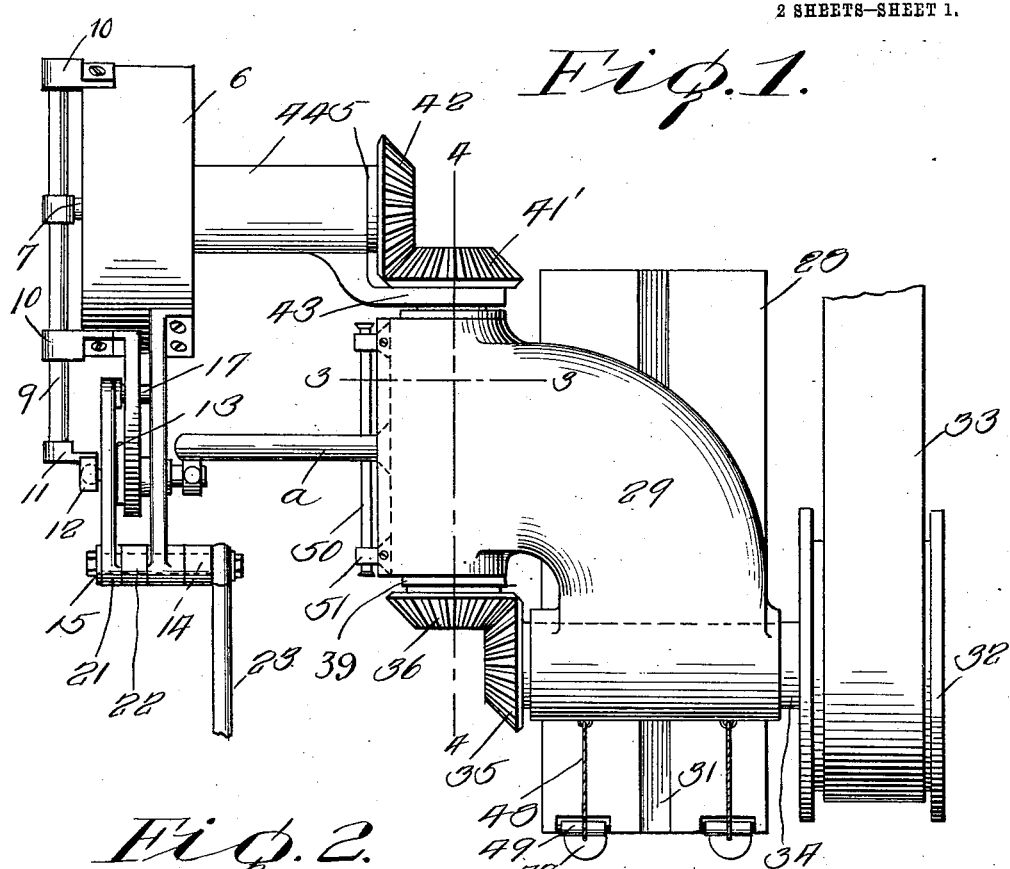
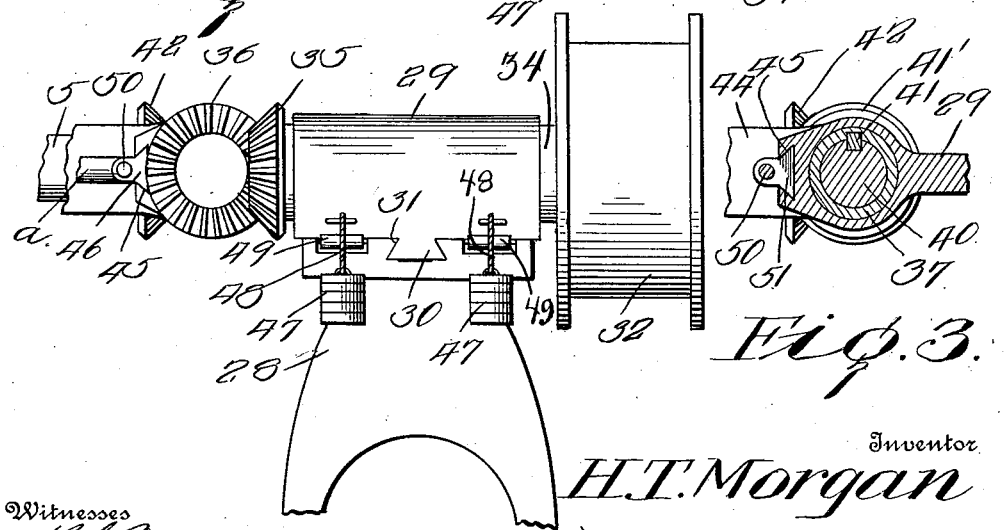
Witnesses
Inventor
H. T. Morgan
By Chandler & Chandler
Attorney

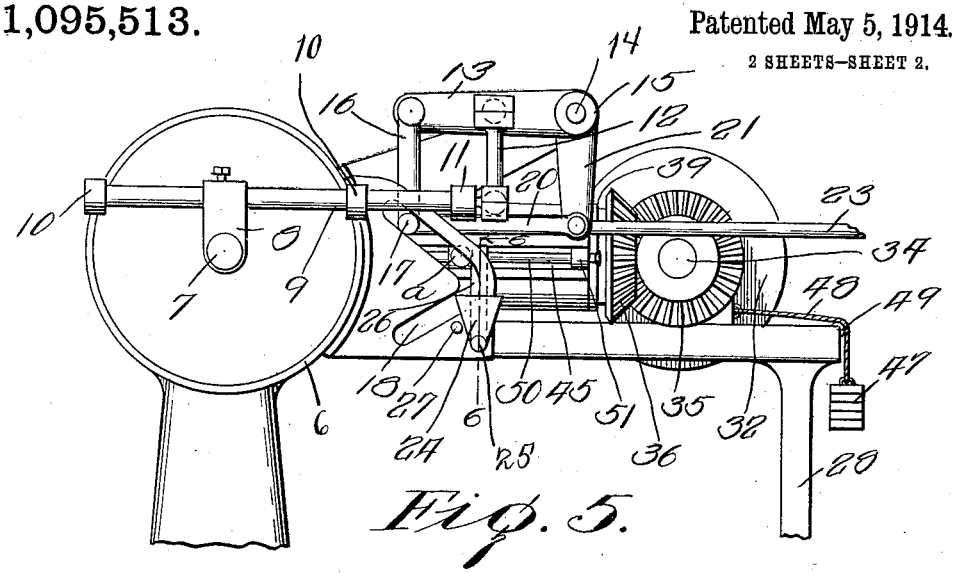
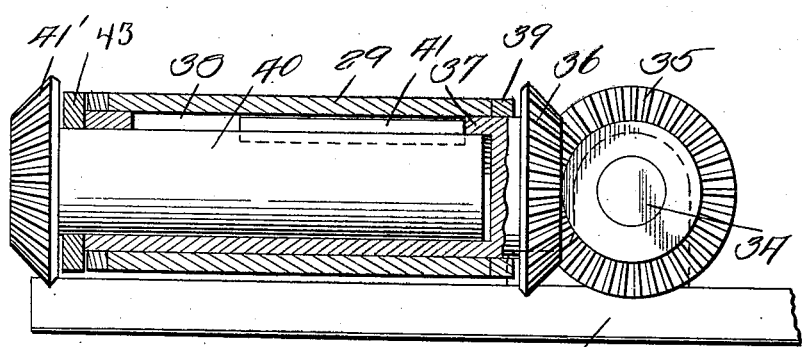
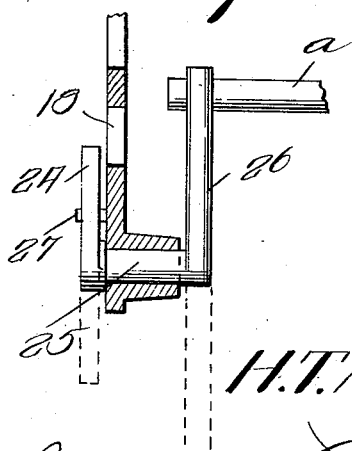

UNITED STATES PATENT OFFICE.

HARRY T. MORGAN, OF PHILADELPHIA, PENNSYLVANIA.

GOVERNOR STOP CONTROL AND BELT TIGHTENER.

1,095,513.  Specification of Letters Patent.  Patented May 5, 1914.

Application filed December 19, 1912. Serial No. 737,706.

*To all whom it may concern:*

Be it known that I, HARRY T. MORGAN, a citizen of the United States, residing at Philadelphia, in the county of Philadelphia, State of Pennsylvania, have invented certain new and useful Improvements in Governor Stop Control and Belt Tighteners; and I do hereby declare the following to be a full, clear, and exact description of the invention, such as will enable others skilled in the art to which it appertains to make and use the same.

This invention relates to certain new and useful improvements in a governor stop control device and belt tightener for engines.

As is well known, in certain types of steam engines, such as the Corliss gear engines, the governor is so constructed that when it is down in its lowest position the valves of the engine will not admit steam to the cylinder. The purpose of this is that should the belt driving the governor break the governor will drop to its lowest position and shut down the engine. Usually a governor stop is provided so that if in the operation of the engine it is desired to avoid shutting the latter down completely the stop can be set in a position to prevent the governor going to the limit of its downward movement, thereby allowing the engine to be readily started again. It frequently happens that the stop is not removed after the engine is started and thus should the governor belt slacken or break the governor will come to rest on the stop and continue to allow the valve to admit steam to the engine, causing the latter to run away, with the consequent liability of wreckage or damage.

The reason for leaving the stop in position to hold the governor up is to prevent the governor from shutting down the engine in case of an overload which may be momentarily encountered by the engine, but which is sufficient to cause the governor to lose its velocity and fall.

In carrying out my invention it is my purpose to provide a mechanism by means of which the governor stop may be maintained in position to prevent the shutting down of the engine in case of an overload, but such mechanism will automatically and immediately remove the stop and allow the governor to fall to its lowermost position to stop the engine in the event the governor belt breaks or slips off from the pulley.

It is also my purpose to provide an automatic governor stop controlling device and combined belt tightener which will embody in its construction the desired features of efficiency, simplicity, economy and reliability.

In the present instance, I have shown my invention as employed in connection with a well known form of governor, such as is used on the Rice and Sargent Corliss engine, but I wish it to be understood that the invention may be employed in connection with other types of engines as it is not limited in its useful application to the particular structure herein set forth by way of illustration.

My invention consists in construction, combination and arrangement of parts, set forth in and falling within the scope of the appended claims.

In the accompanying drawings: Figure 1 is a top plan view of the mechanism embodying my invention and showing the application of the same in connection with the governor stop. Fig. 2 is a view in end elevation. Fig. 3 is a cross sectional view taken on the line 3—3 of Fig. 1. Fig. 4 is a sectional view taken on the line 4—4 of Fig. 1. Fig. 5 is a conventional illustration of the governor construction and illustrating the location and coöperation of the governor stop control pin therewith. Fig. 6 is a view taken on line 6—6 of Fig. 5.

In order that my invention may be readily understood by those skilled in the art, I have in Fig. 5 conventionally illustrated a Rites governor, such as is used in connection with the Rice and Sargent Corliss engine. The governor shaft which is shown at 5 turns the usual weight springs and links within the casing 6, the velocity of such weights causing the spool 7 to move out or in. This spool is free to revolve within the collar 8 and when such spool moves out or in shifts the collar 8 and the bar 9 loosely mounted in the brackets 10. The bar 9 in turn moves the member 11 which is rigid therewith and is connected with the link 12 which in turn is connected with the lever 13. This lever is connected to the shaft 14 and is held in place by the nut and washer as at 15. When the lever 13 is shifted by the links 12 it likewise moves the link 16 up or down, this link 16 having a projection 17 on the lower end thereof, which fits in the slot 18 of the bracket 19, this slot controlling the movement of the link 20 and causing it to move to the right or to the left. This link 20 operates the crank 21 which is rigidly fastened to the shaft 14 so that when the latter turns the crank 22 also turns, thereby actuating the governor cut off rod 23.

The governor stop is shown at 24, and in Fig. 6 is shown in its uppermost position to receive the governor when the engine is stopped. The dotted lines in said figure illustrate the position of the governor stop in its lowermost position. Connected with the governor stop 24 is the stud pin 25 extending through the bracket 19 and carrying at its opposite end an arm 26 which is designed to be contacted with and operated by the governor stop controlling rod which forms an important feature of my invention, such rod being indicated by the reference letter $a$. At 27 is a pin for limiting the movement of the governor stop 24, and when in its elevated position the stop rests against this pin, the latter being carried by the bracket 19. In the type of governor shown herein, when the projection 17 on the link 16 is at the end of its travel in the slot, either up or down, the governor cut off rod is at the limit of its travel and will not allow the valves to admit steam to the cylinder. The governor stop 24 as will be understood, keeps the governor from dropping all the way down should the engine encounter a momentary overload.

I will now proceed to describe in detail the construction and arrangement of my invention and its operation and connection with the governor. As above pointed out, the arm or projection 17 is designed to rest upon the governor stop 24 when the engine is stopped and the governor at rest. To obtain the automatic control of the governor stop I provide the following control mechanism: The numeral 28 indicates the frame upon which is slidingly mounted the carriage 29, through the medium of a dove-tailed rib 30 moving in the dove-tailed guide way 31. 32 is the governor belt pulley driven by the governor belt 33. This pulley is mounted upon the shaft 34 carrying at its opposite end the bevel gear 35 meshing with a similar bevel gear 36, which latter is secured to the hollow sleeve 37 which sleeve is provided with a key way 38 cut longitudinally thereof and such sleeve is placed inside of the carriage 29 and is provided with a collar 39 to hold it in position. This sleeve 37 with the key way drives the spindle 40 by means of the key 41 carried by and fast with the spindle 40, but free to move in the key way in the sleeve 37. This construction permits the sleeve and the whole carriage 29 to move away from the spindle 40. The spindle 40 is provided with a bevel gear 41' meshing with a similar bevel gear 42, the gears being held in engagement by means of a suitable collar 43 which forms a part of the bearing sleeve 44, the spindle being free to turn in the collar, and it will thus be seen that the gear 42 drives the shaft 5, which in turn drives the governor. The carriage 29 is further provided with a bevel slot 45 in which is seated the bevel foot 46 of the governor stop control pin $a$.

When the engine is running and the governor performing its normal operation the governor stop will elevate in its "up position" with the governor control pin $a$ in contact with the arm 26 of the stop. If the engine should become suddenly overloaded the governor will lower onto the governor stop and descend no farther, thus allowing the engine to continue running, but in case the governor belt should break or slip off the pulley, the carriage 29 would be immediately moved or shifted on the bed by means of the weights 47 which are connected to the carriage by the cables or cords 48 running over the rollers 49. This sliding movement of the carriage will cause the controlling rod $a$ to strike the arm 26 and move the governor stop $a$ out of its elevated position turning the same to the position shown in dotted lines in Fig. 5. Consequently when the governor dropped it would move to its lowest position and cut off the engine. It will further be seen that the weights 47 exert a pull on the governor belt 33 and thus maintain the belt under the proper tension thus taking up any slack which might occur. The stretching of the belt may at times alter the position of the stop control rod $a$ and this is compensated for by adjusting the screw rod 50 which passes through the pin $a$. This screw rod is held in position by means of lug 51 passing in the ends of the slot 45.

While I have herein shown and described one particular embodiment of my invention, I wish it to be understood that I do not limit myself to all the precise details of construction herein set forth by way of illustration, as modification and variation may be made without departing from the spirit of the invention or exceeding the scope of the appended claims. For instance, instead of employing weights 47, I may use springs or other equivalent devices, and the control rod $a$ may be designed to operate other forms of mechanism for removing the governor stop.

What I claim is:

1. The combination with a governor control and belt driven mechanism for actuating the same, a stop adapted to hold the governor out of cut off position, a sliding carriage, and a stop control rod connected with the carriage and adapted upon the movement of the latter when the tension upon the belt is broken, to contact with the stop and move the latter away from its governor holding position.

2. The combination with a governor and belt driven mechanism for actuating the same, a stop member for holding the governor out of its cut off position, a bed, a carriage sliding upon the bed, a connection between the carriage and the governor belt, means normally holding the carriage against the pulling action of the belt, and an element carried by the carriage and adapted to contact with the governor stop and move the latter out of governor holding position upon breaking of the tension of the belt.

3. The combination with a governor, of mechanism for actuating the latter, said mechanisms including a shaft, a pulley and a belt for driving the pulley, a sliding carriage in which the shaft is journaled, means connected to the sliding carriage acting in opposition to the pull of the belt and an element carried by the sliding carriage and adapted when the latter is moved by the last mentioned means upon the breaking of the tension of the belt to contact with the stop and shift the latter to allow the governor to move to its cut off position.

4. The combination with a governor, and a stop for holding the latter out of cut off position, of a bed, a carriage sliding on the bed, a shaft journaled in the carriage, a drive pulley on the shaft, a drive belt for the pulley, power transmitting mechanism between the shafts and the governor for actuating the latter, a governor stop controlling rod connected with the carriage and weights also connected with the carriage and adapted to act upon the same against the pulling of the belt, the construction and arrangement being such that upon the breaking of the belt the carriage will be shifted to cause the control rod to move the governor stop and permit the governor to move to its cut off position.

In testimony whereof, I affix my signature, in the presence of two witnesses.

HARRY T. MORGAN.

Witnesses:
  M. C. MORGAN,
  CHAS. L. STRAUSS.

---

Copies of this patent may be obtained for five cents each, by addressing the "Commissioner of Patents, Washington, D. C."